United States Patent
Chen et al.

(10) Patent No.: US 12,414,024 B2
(45) Date of Patent: Sep. 9, 2025

(54) REDUCING SERVICE DISRUPTION IN HANDOVER SCENARIOS

(71) Applicant: ZTE Corporation, Guangdong (CN)

(72) Inventors: Zhongming Chen, Guangdong (CN); He Huang, Guangdong (CN); Xiaojuan Shi, Guangdong (CN); Jing Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 521 days.

(21) Appl. No.: 17/732,855

(22) Filed: Apr. 29, 2022

(65) Prior Publication Data

US 2022/0256427 A1 Aug. 11, 2022

Related U.S. Application Data

(63) Continuation of application No. PCT/CN2019/114224, filed on Oct. 30, 2019.

(51) Int. Cl.
*H04W 36/00* (2009.01)
*H04W 36/38* (2009.01)

(52) U.S. Cl.
CPC .................. *H04W 36/38* (2013.01)

(58) Field of Classification Search
CPC ... H04W 36/38; H04W 36/026; H04W 36/08; H04W 36/0044
See application file for complete search history.

(56) References Cited

U.S. PATENT DOCUMENTS

| | | | |
|---|---|---|---|
| 10,893,446 B2 | 1/2021 | Xu et al. | |
| 11,044,643 B2 | 6/2021 | Centonza et al. | |
| 2018/0279193 A1* | 9/2018 | Park | H04W 36/08 |
| 2019/0268815 A1 | 8/2019 | Zhu et al. | |
| 2019/0313295 A1 | 10/2019 | Xu et al. | |
| 2020/0128452 A1* | 4/2020 | Centonza | H04W 36/30 |
| 2020/0374689 A1 | 11/2020 | Shi et al. | |
| 2020/0374765 A1 | 11/2020 | Zong et al. | |

(Continued)

FOREIGN PATENT DOCUMENTS

| CN | 108377567 A | * 8/2018 | ........ H04W 28/0268 |
|---|---|---|---|
| CN | 108605254 A | 9/2018 | |
| CN | 109819487 A | 5/2019 | |

(Continued)

OTHER PUBLICATIONS

OPPO (Updating for solution#5 in FS_URLLC, S2-187843, Aug. 2018).*

(Continued)

*Primary Examiner* — Lakeram Jangbahadur
(74) *Attorney, Agent, or Firm* — Perkins Coie LLP

(57) ABSTRACT

Methods, apparatus, and systems for wireless communication are described. In one example aspect, a method includes performing, by a communication node, a handover procedure from a source base station to a target base station based on information associated with a Protocol Data Unit (PDU) session. The information indicates that at least one tunnel in a list of tunnels that carry user data has a one-to-one correspondence with a Quality of Service (QoS) flow. The method also includes transmitting, for the handover procedure, downlink data to both the source base station and the target base station by the communication node.

12 Claims, 10 Drawing Sheets

(56) References Cited

U.S. PATENT DOCUMENTS

2022/0295338 A1* 9/2022 Ebrahim Rezagah ...................... H04W 36/304

FOREIGN PATENT DOCUMENTS

| | | | |
|---|---|---|---|
| CN | 109842639 A | 6/2019 | |
| CN | 110166273 A | 8/2019 | |
| CN | 110167083 A | 8/2019 | |
| CN | 110383885 A | 10/2019 | |
| WO | 2018/130968 A1 | 7/2018 | |
| WO | WO-2018137458 A1 * | 8/2018 | ............ H04W 28/02 |
| WO | 2018206855 A1 | 11/2018 | |

OTHER PUBLICATIONS

International Search Report and Written Opinion mailed on Jul. 24, 2020 for International Application No. PCT/CN2019/114224, filed on Oct. 30, 2019 (8 pages).
OPPO, "Updating for solution#5 in FS_URLLC", SA WG2 Meeting #128bis, Sophia Antipolis, France, S2-187843, 6 pages, Aug. 20-24, 2018.
Chinese office action issued in CN Patent Application No. 201980101730.1, dated Sep. 22, 2023, 14 pages. English translation included.
Chinese Notification to Complete Formalities of Registration issued in CN Patent Application No. 201980101730.1, dated Apr. 18, 2024, 4 pages. English translation included.

* cited by examiner

REDUCING SERVICE DISRUPTION IN HANDOVER SCENARIOS

CROSS-REFERENCE TO RELATED APPLICATIONS

This application is a continuation of International Patent Application No. PCT/CN2019/114224, filed on Oct. 30, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for reducing service disruptions in handover scenarios.

In one example aspect, a wireless communication method is disclosed. The method includes performing, by a communication node, a handover procedure from a source base station to a target base station based on information associated with a Protocol Data Unit (PDU) session. The information indicates that at least one tunnel in a list of tunnels that carry user data has a one-to-one correspondence with a Quality of Service (QoS) flow. The method also includes transmitting, for the handover procedure, downlink data to both the source base station and the target base station by the communication node.

The following examples list techniques preferably implemented by some embodiments. In some embodiments, the method includes, prior to performing the handover procedure, transmitting, from the communication node to the source base station, a first message that comprises the information, the first message further indicating a resource assignment for the PDU session. In some embodiments, performing the handover procedure comprises transmitting, from the communication node to the source base station, a second message that includes the information associated with the PDU session. The PDU session is different from an existing PDU session. In some embodiments, the method further includes switching the existing PDU session to the PDU session. In some embodiments, the information further indicates that the PDU session has a one-to-one correspondence with the QoS flow, and/or the QoS flow has a one-to-one correspondence with a Data Radio Bearer (DRB). In some embodiments, the method further includes transmitting the information about the list of tunnels to the target base station. In some embodiments, the method includes receiving, by the communication node, a request from the source base station, the request comprising an indicator indicating a support for a core-network (CN) split function that allows interworking between multiple radio access technologies at a core network level.

In another example aspect, a method for wireless communication is disclosed. The method includes receiving, by a base station, a first message from a communication node, the first message comprising information associated with a Protocol Data Unit (PDU) session, and transmitting, from the base station, a second message to the communication node in response to the first message indicating resources that have been set up and/or resources that failed to be set up for the PDU session. The information indicates at least one tunnel in a list of tunnels that carry user data has a one-to-one correspondence with a Quality of Service (QoS) flow.

The following examples list techniques preferably implemented by some embodiments. In some embodiments, the method includes transmitting, after transmitting the second message, a request for initiating a hand-over procedure from the base station to a target base station. In some embodiments, the method includes transmitting, prior to receiving the first message, a request for initiating a hand-over procedure from the base station to a target base station. In some embodiments, the PDU session is different than an existing PDU session, and the method further includes switching to the PDU session from the existing PDU session. In some embodiments, the method includes transmitting, by the base station, a request to the communication node that comprises an indicator indicating a support for a core-network (CN) split function that allows interworking between multiple radio access technologies at a core network level. In some embodiments, the information further indicates that the PDU session has a one-to-one correspondence with the QoS flow, and/or the QoS flow has a one-to-one correspondence with a Data Radio Bearer (DRB). In some embodiments, the method includes receiving, by the base station, an indication for transmitting data to a mobile device based on a QoS flow corresponding to a tunnel associated with the PDU session and establishing, by the base station, a new Data Radio Bearer (DRB) that has a one-to-one correspondence with the QoS flow.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

Figure 1:
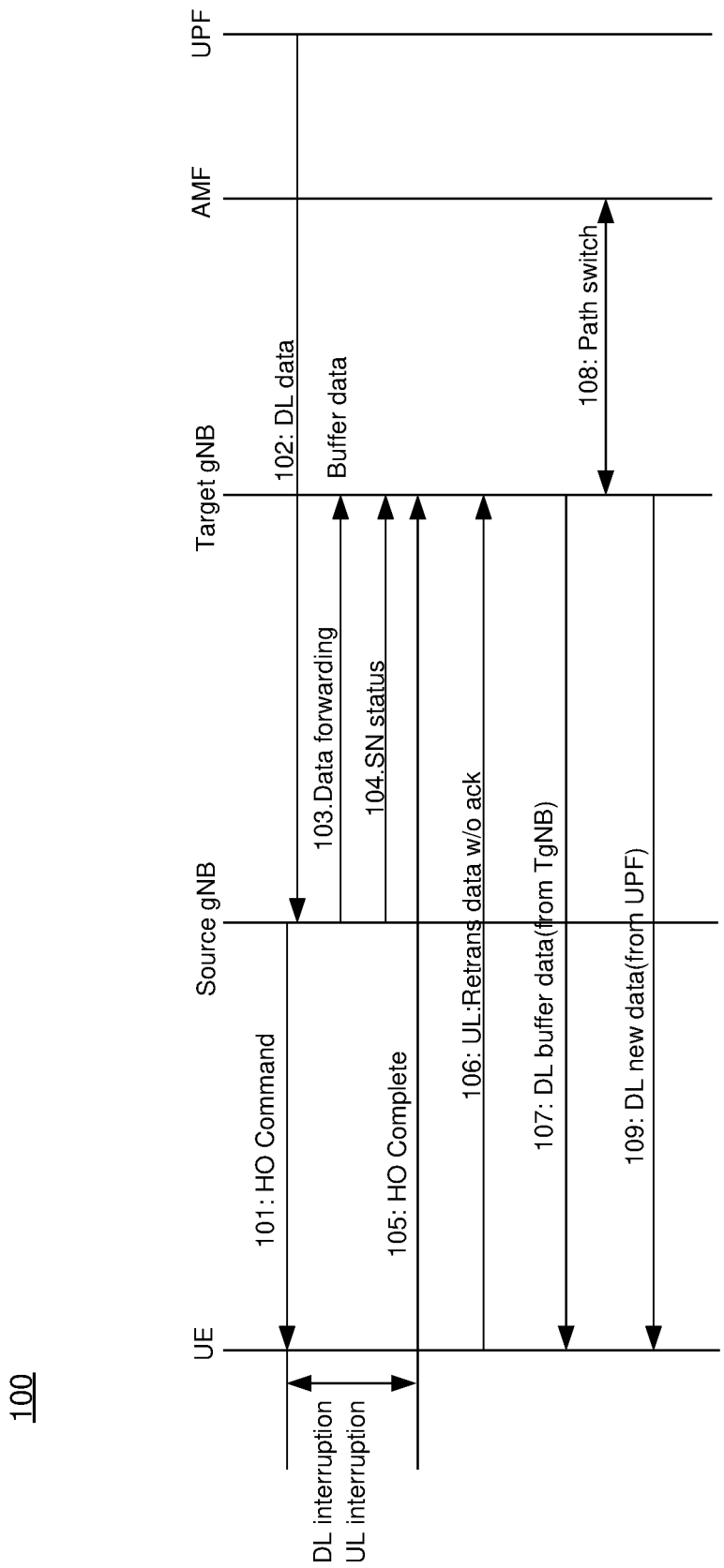
FIG. 1 illustrates an example sequence chart of an example handover procedure for a User Equipment (UE) from a source base station to a target station.

In mobile communication systems, to ensure the quality of the service and provide a satisfactory service experience to users, the mobile devices perform measurements of signal qualities of the serving cell and neighboring cells after establishing a connection with the network. The measurements allow the mobile devices to select and switch to an appropriate cell to meet mobility requirements, triggering a handover procedure. FIG. 1 illustrates an example sequence chart of an example handover procedure 100 for a User Equipment (UE) from a source base station to a target station. The handover procedure 100 includes the following operations:

Operation 101: The source base station transmits a handover (HO) command to the UE.

Operation 102: The User Plane Function (UPF) continues to send downlink (DL) data to the source base station.

Operation 103: The source base station receives the DL data from the UPF and forwards the data to the target base station. The target base station can start to buffer the received data.

Operation 104: The source base station informs the target base station of the current Secondary Node (SN) status.

Operation 105: After the UE receives the HO command, the UE disconnects from the source base station and establishes a connection with the target base station. If the connection is established successfully, the UE sends a HO complete message to the target base station.

Operation 106: The UE has failed to receive acknowledgements for a portion of the data due to the handover. The UE now retransmits that portion to the target base station.

Operation 107: The target base station can start to send the buffered DL data to the UE.

Operation 108: A path switch operation is performed so that a path is established between the target base station and the Access and Mobility Management Function (AMF)/UPF.

Operation 109: The UPF now transmits data to the target base station, and the target base station transmits the data to the UE. The data transmission and reception are now back to normal.

Several operations in the above procedure can cause service interruptions and/or delays:

1. The target base station needs to obtain the SN status first before performing SN allocation and uplink data transmission detection.
2. The target base station needs to obtain DL data from the source base station.
3. The UE needs to perform a random-access procedure to establish a connection with the target base station.
4. The path switch operation needs to be performed to establish the path between UPF and the target base station.

To minimize potential delays and service interruptions, DL data can be simultaneously transmitted to the source base station and the target base station, thereby eliminating the need for path switch operation and the need for the target base station to buffer the DL data.

Figure 2:
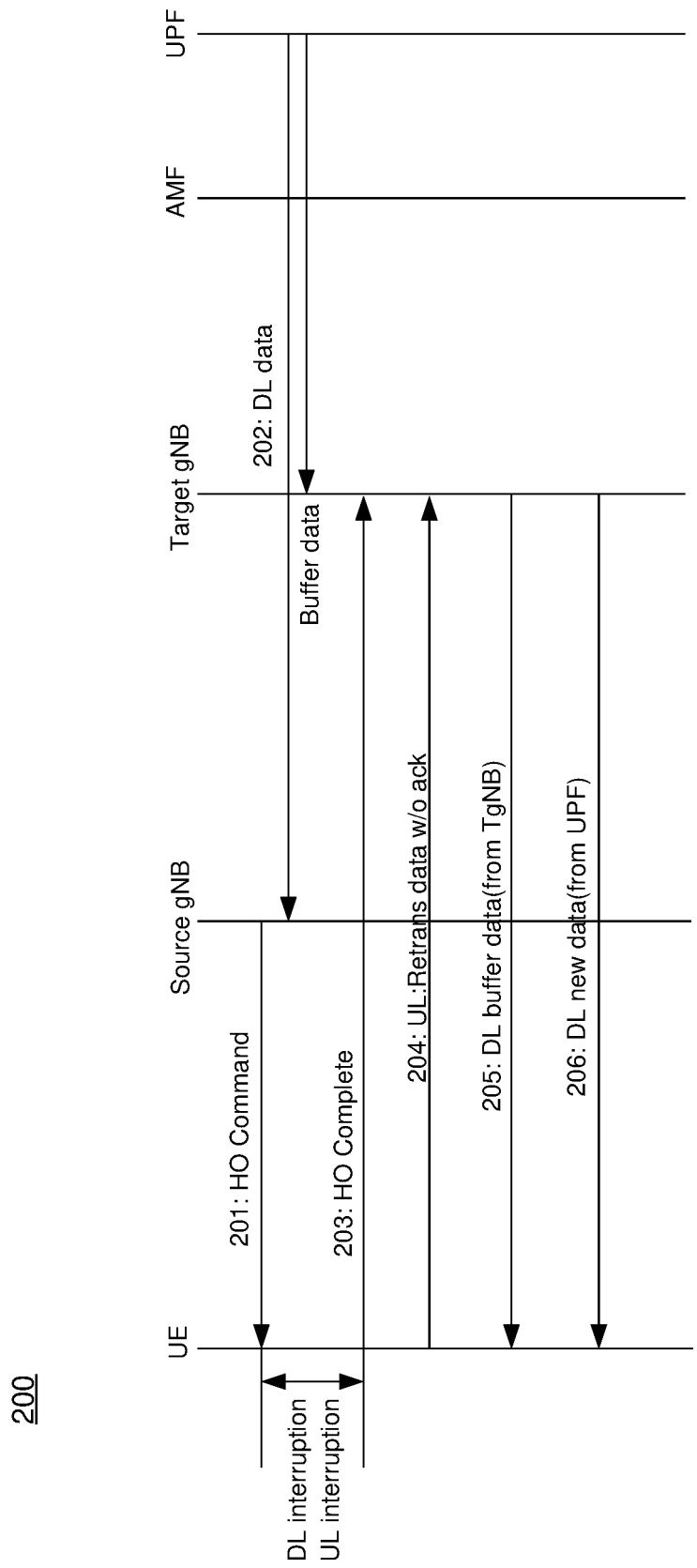
FIG. 2 illustrates an example sequence chart of an example handover procedure.

FIG. 2 illustrates an example sequence chart of an example handover procedure 200. The handover procedure 200 includes the following operations:

Operation 201: The source base station transmits a handover (HO) command to the UE.

Operation 202: The UPF transmits DL data to the source base station and the target base station simultaneously. The target base station can start to buffer the received data.

Operation 203: After the UE receives the HO command, the UE disconnects from the source base station and establishes a connection with the target base station. If the connection is established successfully, the UE sends a HO complete message to the target base station.

Operation 204: The UE has failed to receive acknowledgements for a portion of the data due to the handover. The UE now retransmits that portion to the target base station.

Operation 205: The target base station can start to send the buffered DL data to the UE.

Operation 206: The UPF now transmits data to the target base station, and the target base station transmits the data to the UE. The data transmission and reception are now back to normal.

Using the above procedure, there is no longer a need for the source base station to transmit data to the target base station, which can take 20 to 30 milliseconds to complete. Furthermore, there is no need to perform a path switch operation, thereby reducing the delay and/or service interruption for the UE.

Furthermore, the granularity of a 5G communication service is based on Packet Data Unit (PDU) session. That is, a communication service can be considered as an association between the UE and a data network that provides a PDU connectivity service.

Figure 3:
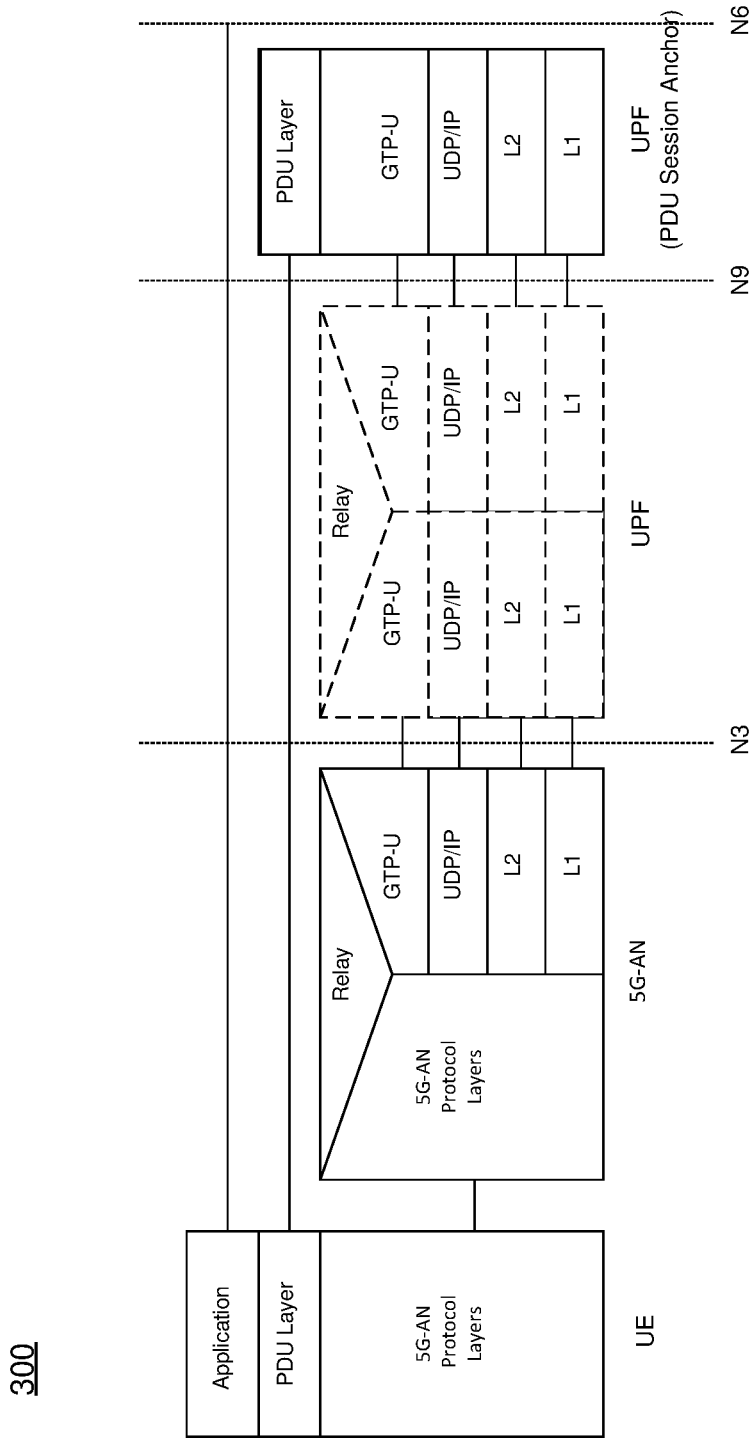
FIG. 3 illustrates an example protocol stack of a Protocol Data Unit (PDU) Session.

FIG. 3 illustrates an example protocol stack 300 of a PDU Session. A PDU session can include multiple Quality of Service (QoS) flows (not shown). Each QoS flow can be mapped to multiple Data Radio Bearers (DRBs). The handover procedure as shown in FIG. 2 can adopt mapping rules with respect to the PDU session, the QoS flow(s) and the DRB(s) to allow the UPF/AMF to transmit DL data to the source base station and the target base station simultaneously. The mapping rules can specify that a PDU session can only include a single QoS flow that has a one-to-one mapping correspondence with a DRB. Additional signaling information can be exchanged to ensure that the PDU session meets the condition specified by the mapping rules.

Figure 4:
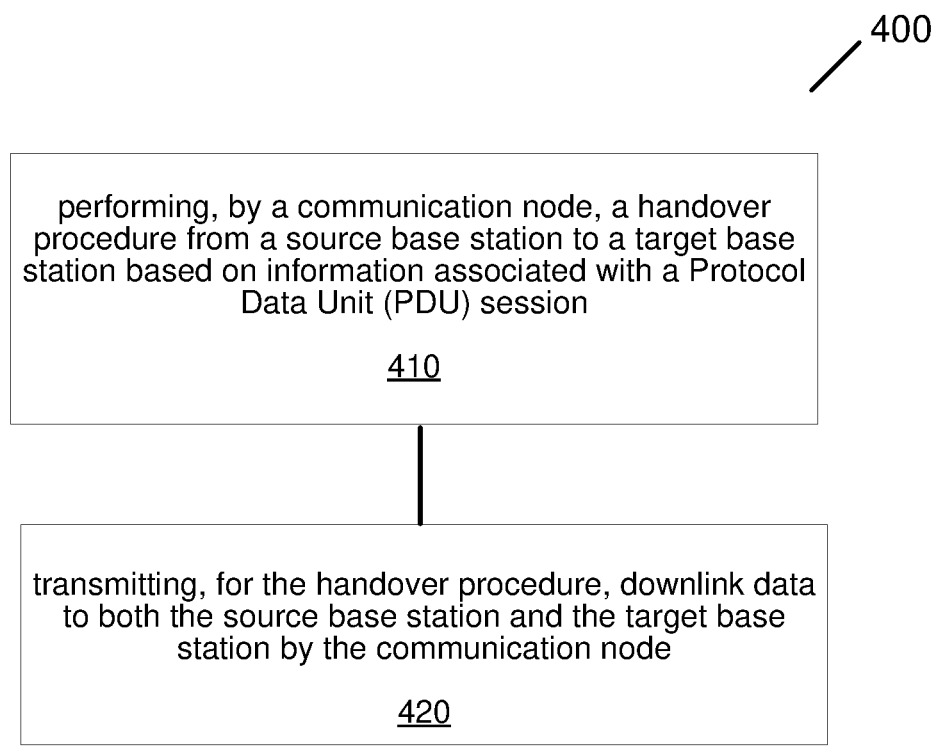
FIG. 4 is a flowchart representation of a method for wireless communication in accordance with the present disclosure.

FIG. 4 is a flowchart representation of a method for wireless communication in accordance with the present disclosure. The method 400 includes, at operation 410, performing, by a communication node (e.g., SFM/UPF), a handover procedure from a source base station to a target base station based on information associated with a Protocol Data Unit (PDU) session. The information indicates that at least one tunnel in a list of tunnels that carry user data has a one-to-one correspondence with a Quality of Service (QoS) flow. The method 400 also includes, at operation 420, transmitting, for the handover procedure, downlink data to both the source base station and the target base station by the communication node.

In some embodiments, the method includes, prior to performing the handover procedure, transmitting, from the communication node to the source base station, a first message that comprises the information, the first message further indicating a resource assignment for the PDU session. In some embodiments, performing the handover procedure comprises transmitting, from the communication node to the source base station, a second message that includes the information associated with the PDU session. The PDU session is different from an existing PDU session. In some embodiments, the method further includes switching the existing PDU session to the PDU session. In some embodiments, the information further indicates that the PDU session has a one-to-one correspondence with the QoS flow, and/or the QoS flow has a one-to-one correspondence with a Data Radio Bearer (DRB). In some embodiments, the method further includes transmitting the information about the list of tunnels to the target base station. In some embodiments, the method includes receiving, by the communication node, a request from the source base station, the request comprising an indicator indicating a support for a core-network (CN) split function that allows interworking between multiple radio access technologies at a core network level.

Figure 5:
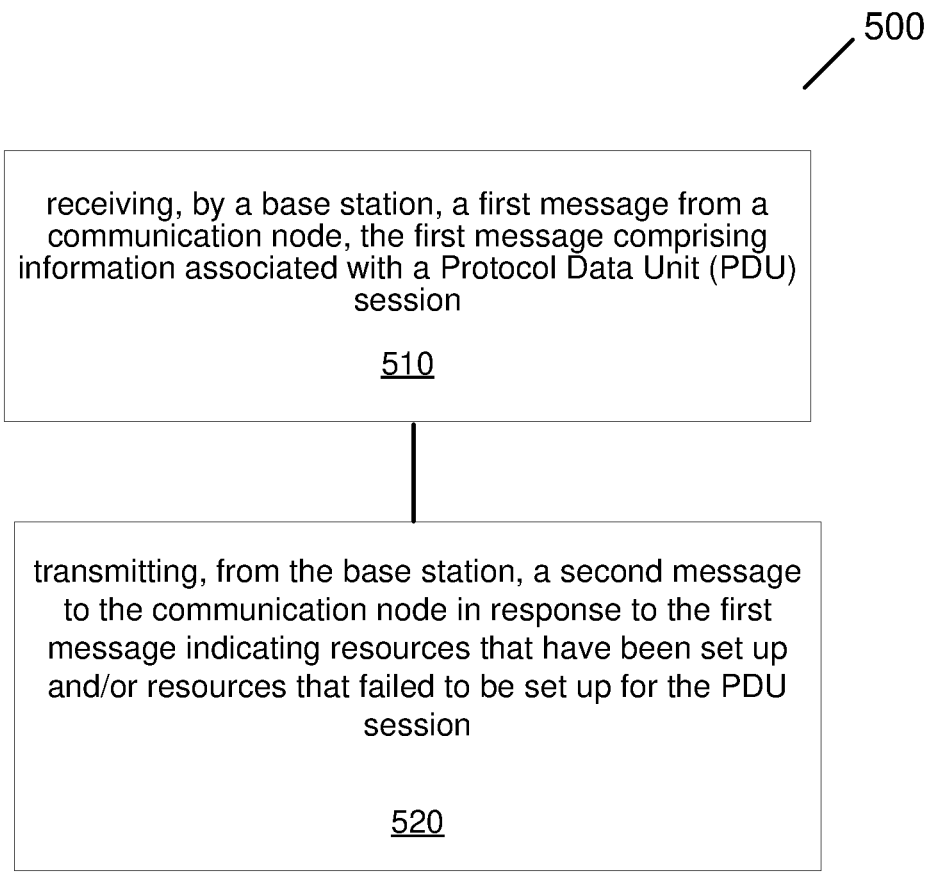
FIG. 5 a flowchart representation of a method for wireless communication in accordance with the present disclosure.

FIG. 5 a flowchart representation of a method for wireless communication in accordance with the present disclosure. The method 500 includes, at operation 510, receiving, by a base station, a first message from a communication node (e.g., UPF/AMF). The first message comprises information associated with a Protocol Data Unit (PDU) session. The information indicates at least one tunnel in a list of tunnels that carry user data has a one-to-one correspondence with a Quality of Service (QoS) flow. The method 500 also includes, at operation 520, transmitting, from the base station, a second message to the communication node in response to the first message indicating resources that have been set up and/or resources that failed to be set up for the PDU session.

In some embodiments, the method includes transmitting, after transmitting the second message, a request for initiating a hand-over procedure from the base station to a target base station. In some embodiments, the method includes transmitting, prior to receiving the first message, a request for initiating a hand-over procedure from the base station to a target base station. In some embodiments, the PDU session is different than an existing PDU session, and the method further includes switching to the PDU session from the existing PDU session. In some embodiments, the method includes transmitting, by the base station, a request to the communication node that comprises an indicator indicating a support for a core-network (CN) split function that allows interworking between multiple radio access technologies at a core network level. In some embodiments, the information further indicates that the PDU session has a one-to-one correspondence with the QoS flow, and/or the QoS flow has a one-to-one correspondence with a Data Radio Bearer (DRB). In some embodiments, the method includes receiving, by the base station, an indication for transmitting data to a mobile device based on a QoS flow corresponding to a tunnel associated with the PDU session and establishing, by the base station, a new Data Radio Bearer (DRB) that has a one-to-one correspondence with the QoS flow.

Some examples of the disclosed techniques are described in the following example embodiments.

Embodiment 1

Figure 6:
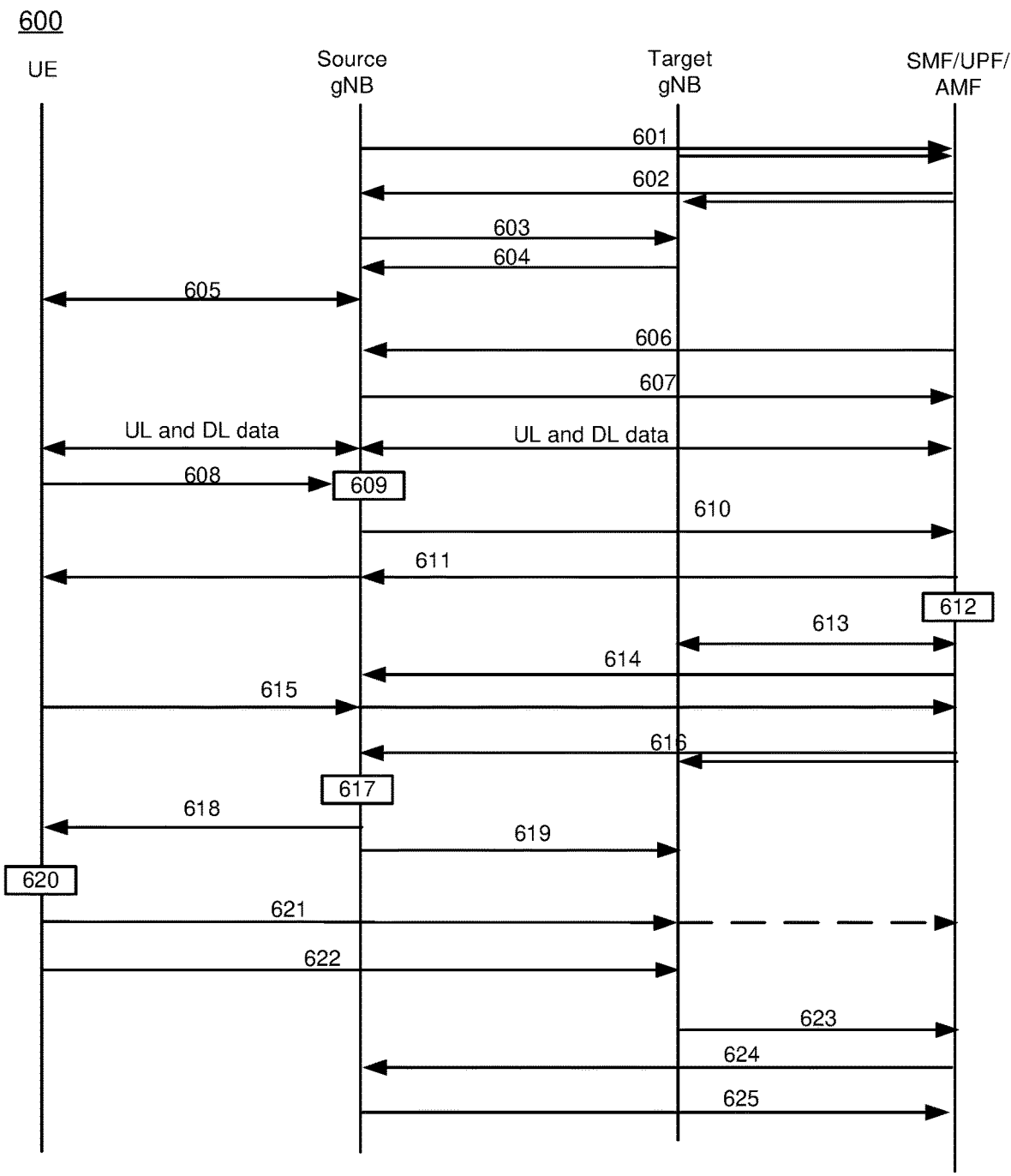
FIG. 6 illustrates an example sequence chart of a handover procedure.

This embodiment describes scenarios in which the mapping rules are enforced when the PDU session is established. FIG. 6 illustrates an example sequence chart of a handover procedure 600. Operations shown in FIG. 6 include the following:

Operation 601: The source base station transmits a New-Generation (NG) setup request to the SMF. The NG setup request includes an indicator indicating whether a Core-Network (CN) split function is supported during the handover process so that the SMF can make determination regarding how to initiate the handover procedure. Similarly, the target base station can also transmit, to the SMF, an NG setup request that includes an indicator indicating whether a Core-Network (CN) split function is supported.

Operation 602: The SMF responds with an NG setup response.

Operation 603: The source base station transmits an Xn setup request to the target base station (or, alternatively, the target base station can transmit an Xn setup request to the source base station). The Xn setup request includes an indicator indicating whether a Core-Network (CN) split function is supported by either the source base station or the target base station.

Operation 604: The target base station transmits an Xn setup response to the base station (or, alternatively, the source base station transmits an Xn setup response to the target base station). The Xn setup response includes an indicator indicating whether a Core-Network (CN) split function is supported by either the target base station or the source base station. When the source base station sends a handover request to the SMF, it can determine, based on the information carried in the Xn setup request and/or response, whether a CN-split tunnel switching should be requested.

Operation 605: The UE establishes a Radio Resource Control (RRC) connection with the source base station.

Operation 606: The SMF transmits a PDU Session Resource Setup Request to the source base station. The request includes information of one or more tunnels to be established between the SMF and the source base station. In particular, the information can indicate that a General Packet Radio Service Tunneling Protocol User data (GTP-U) tunnel has a one-to-one correspondence with the QoS flow of the PDU session. In addition, the QoS flow also has a one-to-one correspondence with a DRB. In some embodiments, the information indicates that the PDU session has a one-to-one correspondence with the QoS flow and the QoS flow has a one-to-one correspondence with a DRB.

Operation 607: The source base station transmits a PDU Session Resource Setup Response to the SMF. If resource setup has failed, the response does not include relevant information. If the resource setup was successful, the response can also include information of the one or more tunnels. For example, the response can include information indicating that that a General Packet Radio Service Tunneling Protocol User data (GTP-U) tunnel has a one-to-one correspondence with the QoS flow and the QoS flow has a one-to-one correspondence with a DRB. In some embodiments, the information indicates that the PDU session has a one-to-one correspondence with the QoS flow and the QoS flow has a one-to-one correspondence with a DRB. If the resource setup was successful, the UE and the SMF/UPF can transmit and receive data normally.

Operation 608: The source base station receives measurement reports from the UE.

Operation 609: The source base station determines to trigger a handover procedure including a CN-split tunnel switching operation.

Operation 610: The source base station transmits a Handover Required message that includes at least one of: PDU session identifier (ID), target base station ID, Packet Data Convergence Protocol (PDCP) SNdl−2 (which indicates the downlink PDCP sequence number), and/or the mapping between PDCP and GTP-U tunnel (which indicates the correspondence between the PDCP sequence number and the GTP-U sequence number for the handover).

Operation 611: The source base station receives downlink data and transmit it to the UE using PDCP SNdl−1.

Operation 612: The SMF determines to perform the handover procedure including the CN-split tunnel switching operation.

Operation 613: The SMF establishes a new tunnel to the target base station in the same PDU session. The new tunnel shares the same Internet Protocol (IP) address with the existing tunnel. The SMF also transmits the information indicating the mapping between PDCP and GTP-U tunnel to the target base station.

Operation 614: The SMF transmits Handover (HO) command to the source base station. The command can indicate whether data forwarding is needed. Here, there is no need to perform data forwarding as the SMF can transmit downlink data to the target base station by itself.

Operation 615: The source base station receives uplink data from the UE with PDCP SNul (which indicates the uplink PDCP sequence number). The source base station forwards the uplink data to UPF.

Operation 616: The source base station receives downlink data from UPF with sequence number SNdl. The source base station also receives an indication of start of redundant transmission, indicating that UPF transmits downlink data to both the source and target base stations at the same time. The target base station receives downlink data from the UPF. The target base station can determine PDCP SNdl based on the mapping of PDCP and GTP-U and start to buffer data.

Operation 617: The source base station receives in the indication of start of redundant transmission to know that UPF has begun dual-path transmission. The source base station receives PDCP SNdl as well.

Operation 618: The source base station can transmit the HO command to the UE. The source base station can subsequently receive DL data from the UPF. The source base station can determine the PDCP serial number based on the correspondence between PDCP and GTP-U (e.g., SNdl) and start to buffer data.

Operation 619: In some embodiments, the source base station transmits SN status to the target base station indicating SNdl and SNul.

Operation 620: The UE terminates its connection with the source base station and establishes a connection with the target base station. The source and target base stations can receive DL data from the UPF, determine PDCP serial number (e.g., SNdl+1), and begin to buffer data.

Operation 621: The UE has failed to receive acknowledgements for a portion of the data due to the handover. The UE now retransmits that portion to the target base station.

Operation 622: The UE transmits HO complete to the target base station.

Operation 623: The target base station notifies the SMF that handover has been completed.

Operation 624: The SMF transmits a path release request to release any tunnels or paths with the source base station.

Operation 625: The source base station transmits an acknowledgement of the path release.

Embodiment 2

Figure 7:
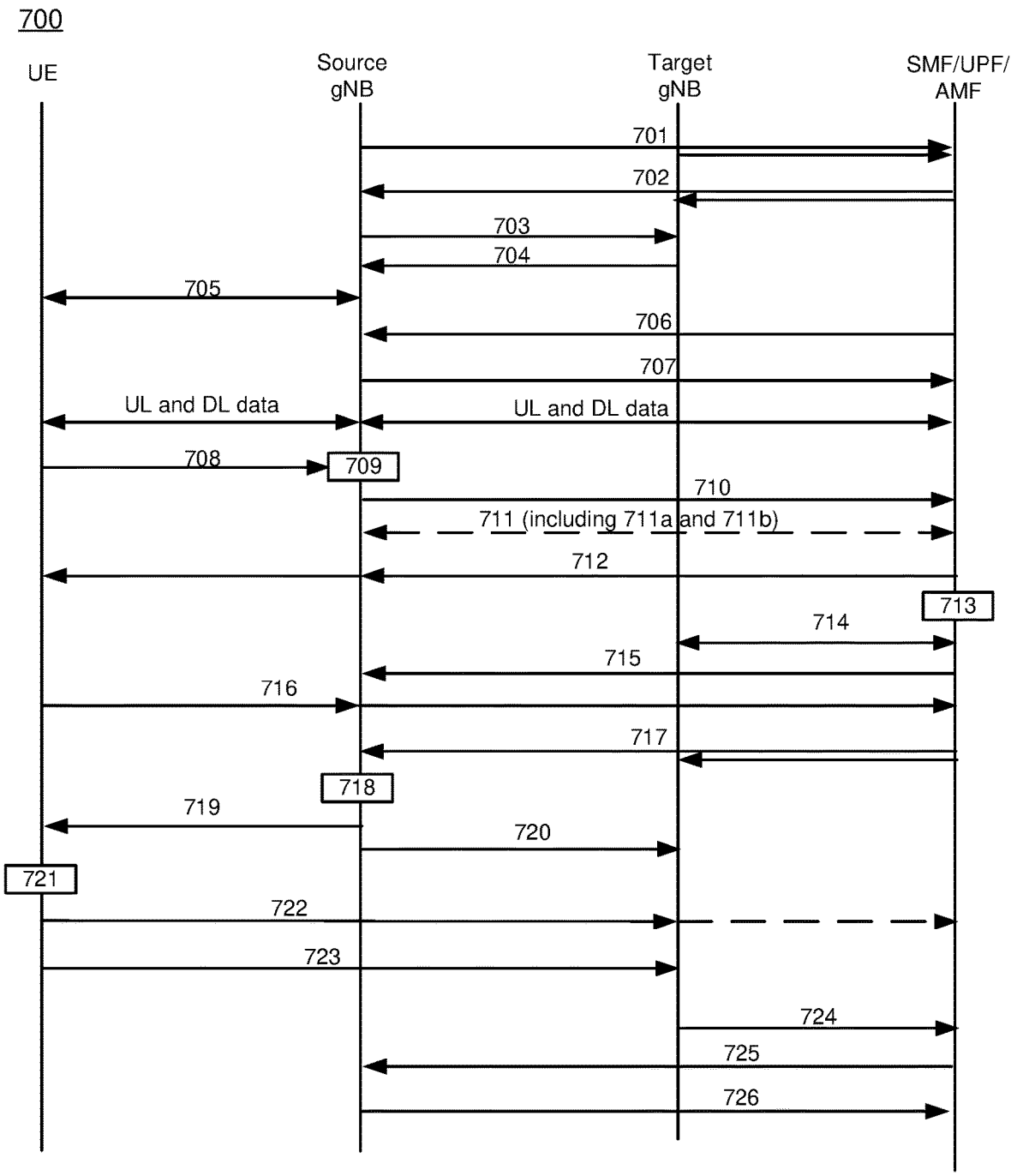
FIG. 7 illustrates an example sequence chart of another handover procedure.

This embodiment describes scenarios in which the mapping rules are satisfied after the PDU session is established. FIG. 7 illustrates an example sequence chart of a handover procedure 700. Operations shown in FIG. 7 include the following:

Operation 701: The source base station transmits a New-Generation (NG) setup request to the SMF. The NG setup request includes an indicator indicating whether a Core-Network (CN) split function is supported during the handover process so that the SMF can make determination regarding how to initiate the handover procedure. Similarly, the target base station also transmits, to the SMF, an NG setup request that includes an indicator indicating whether a Core-Network (CN) split function is supported.

Operation 702: The SMF responds with an NG setup response.

Operation 703: The source base station transmits an Xn setup request to the target base station (or, alternatively, the target base station can transmit an Xn setup request to the source base station). The Xn setup request includes an indicator indicating whether a Core-Network (CN) split function is supported by either the source base station or the target base station.

Operation 704: The target base station transmits an Xn setup response to the base station (or, alternatively, the source base station transmits an Xn setup response to the target base station). The Xn setup response includes an indicator indicating whether a Core-Network (CN) split function is supported by either the target base station or the source base station. When the source base station sends a handover request to the SMF, it can determine, based on the information carried in the Xn setup request and/or response, whether a CN-split handover procedure should be requested.

Operation 705: The UE establishes a Radio Resource Control (RRC) connection with the source base station.

Operation 706: The SMF transmits a PDU Session Resource Setup Request to the source base station.

Operation 707: The source base station transmits a PDU Session Resource Setup Response to the SMF. The response indicates whether resource setup was successful. If the resource setup was successful, the UE and the SMF/UPF can transmit and receive data normally.

Operation 708: The source base station receives measurement reports from the UE.

Operation 709: The source base station determines to trigger a handover procedure including a CN-split tunnel switching operation.

Operation 710: The source base station transmits a Handover Required message that includes at least one of: PDU session identifier (ID), target base station ID, Packet Data Convergence Protocol (PDCP) SNdl−2 (which indicates the downlink PDCP sequence number), and/or the mapping between PDCP and GTP-U tunnel (which indicates the correspondence between the PDCP sequence number and the GTP-U sequence number for the handover).

Operation 711: Because the mapping rules have not yet been enforced yet in the PDU session for the CN-split tunnel switch (that is, the GTP-U tunnel and the QoS flow do not have a one-to-one correspondence yet), the AMF and the Radio Access Network (RAN) need to establish a new PDU session so that the mapping rules can be satisfied.

Operation 711a: For the new PDU session, the SMF transmits a PDU Session Resource Setup Request to the source base station. The request includes information of one or more tunnels to be established between the SMF and the source base station. In particular, the information can indicate that a General Packet Radio Service Tunneling Protocol User data (GTP-U) tunnel has a one-to-one correspondence with the QoS flow of the PDU session. In addition, the QoS flow also has a one-to-one correspondence with a DRB. In some embodiments, the information indicates that the PDU session has a one-to-one correspondence with the QoS flow and the QoS flow has a one-to-one correspondence with a DRB.

Operation 711b: The source base station transmits a PDU Session Resource Setup Response to the SMF. If resource setup has failed, the response does not include relevant information. If the resource setup was successful, the response can also include information of the one or more tunnels. For example, the response can include information indicating that that a General Packet Radio Service Tunneling Protocol User data (GTP-U) tunnel has a one-to-one correspondence with the QoS flow and the QoS flow has a one-to-one correspondence with a DRB. In some embodiments, the information indicates that the PDU session has a one-to-one correspondence with the QoS flow and the QoS flow has a one-to-one correspondence with a DRB. If the resource setup was successful, the UE and the SMF/UPF can transmit and receive data normally using the new PDU session.

Operation 712: The source base station receives downlink data and transmit it to the UE using PDCP SNdl−1.

Operation 713: The SMF determines to perform the handover procedure including a CN-split tunnel switching operation.

Operation 714: The SMF establishes a new tunnel to the target base station in the same PDU session. The new tunnel shares the same Internet Protocol (IP) address with the existing tunnel. The SMF also transmits the information indicating the mapping between PDCP and GTP-U tunnel to the target base station.

Operation 715: The SMF transmits Handover (HO) command to the source base station. The command can indicate whether data forwarding is needed. Here, there is no need to perform data forwarding as the SMF can transmit downlink data to the target base station by itself.

Operation 716: The source base station receives uplink data from the UE with PDCP SNul (which indicates the uplink PDCP sequence number). The source base station forwards the uplink data to UPF.

Operation 717: The source base station receives downlink data from UPF with sequence number SNdl. The source base station also receives an indication of start of redundant transmission, indicating that UPF transmits downlink data to both the source and target base stations at the same time. The target base station receives downlink data from the UPF. The target base station can determine PDCP SNdl based on the mapping of PDCP and GTP-U and start to buffer data.

Operation 718: The source base station receives in the indication of start of redundant transmission to know that UPF has begun dual-path transmission. The source base station receives PDCP SNdl as well.

Operation 719: The source base station can transmit the HO command to the UE. The source base station can subsequently receive DL data from the UPF. The source base station can determine the PDCP serial number based on the correspondence between PDCP and GTP-U (e.g., SNdl) and start to buffer.

Operation 720: In some embodiments, the source base station transmits SN status to the target base station indicating SNdl and SNul. SNdl indicates the latest PDCP serial number of the received DL data from UPF. SNul indicates the PDCN serial number of the uplink data to UPF.

Operation 721: The UE terminates its connection with the source base station and establishes a connection with the target base station. The source and target base stations can receive DL data from the UPF, determine PDCP serial number (e.g., SNdl+1), and begin to buffer data.

Operation 722: The UE has failed to receive acknowledgements for a portion of the data due to the handover. The UE now retransmits that portion to the target base station.

Operation 723: The UE may have failed to receive acknowledgements for a portion of the data due to the handover. The UE now retransmits that portion to the target base station (e.g., with PDCP SNul+1). The UE also receives downlink data from the target base station (e.g., with SNdl) and starts to perform redundancy eliminations. The UE then transmits HO complete to the target base station.

Operation 724: The target base station notifies the SMF that handover has been completed.

Operation 725: The SMF transmits a path release request to release any tunnels or paths with the source base station.

Operation 726: The source base station transmits an acknowledgement of the path release.

Embodiment 3

Figure 8:
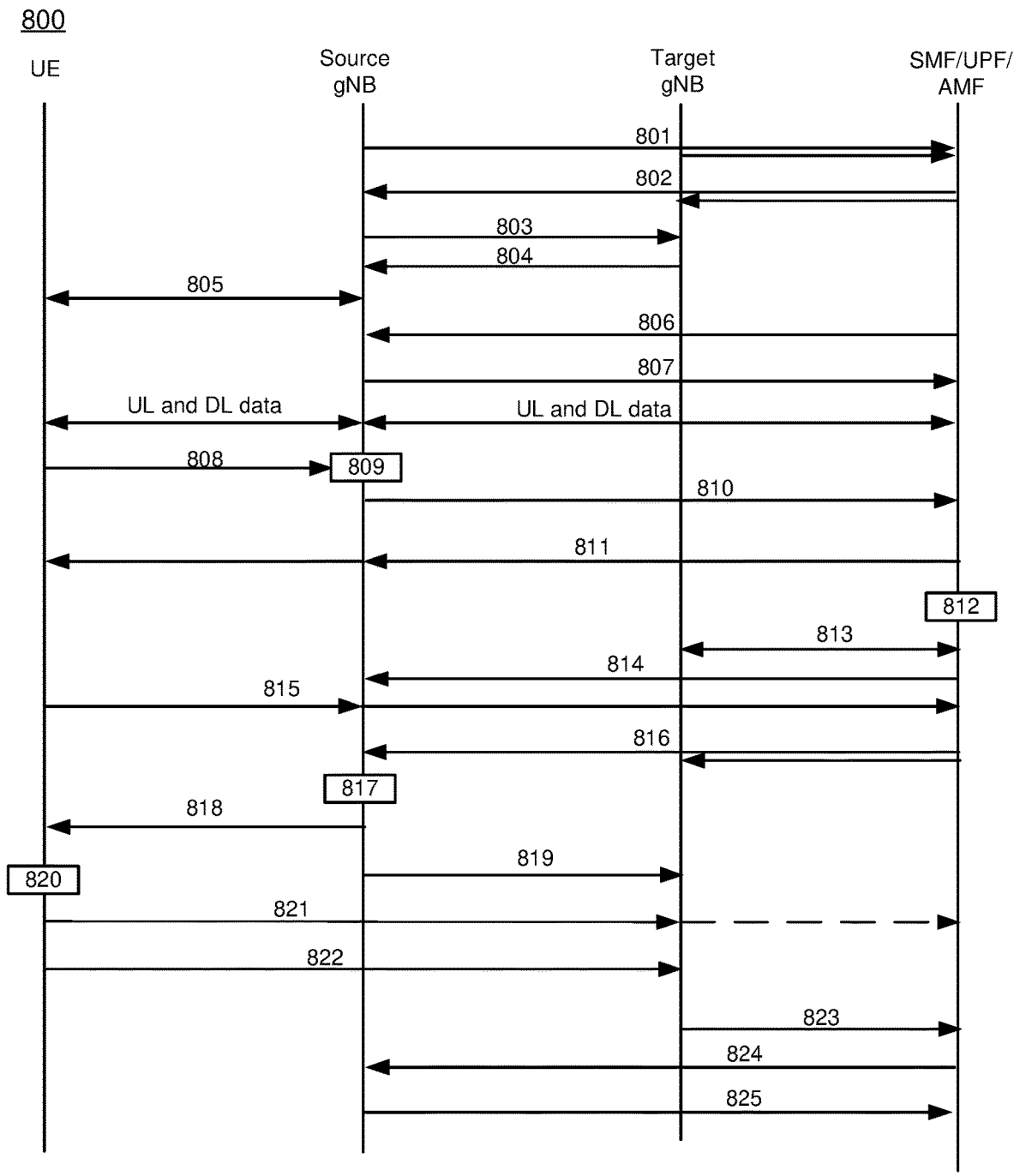
FIG. 8 illustrates an example sequence chart of yet another handover procedure.

This embodiment describes other scenarios in which the mapping rules are satisfied after the PDU session is established. FIG. 8 illustrates an example sequence chart of a handover procedure 800. Operations shown in FIG. 8 include the following:

Operation 801: The source base station transmits a New-Generation (NG) setup request to the SMF. The NG setup request includes an indicator indicating whether a Core-Network (CN) split function is supported during the handover process so that the SMF can make determination regarding how to initiate the handover procedure. Similarly, the target base station also transmits, to the SMF, an NG setup request that includes an indicator indicating whether a Core-Network (CN) split function is supported.

Operation 802: The SMF responds with an NG setup response.

Operation 803: The source base station transmits an Xn setup request to the target base station (or, alternatively, the target base station can transmit an Xn setup request to the source base station). The Xn setup request includes an indicator indicating whether a Core-Network (CN) split function is supported by either the source base station or the target base station.

Operation 804: The target base station transmits an Xn setup response to the base station (or, alternatively, the source base station transmits an Xn setup response to the target base station). The Xn setup response includes an indicator indicating whether a Core-Network (CN) split function is supported by either the target base station or the source base station. When the source base station sends a handover request to the SMF, it can determine, based on the information carried in the Xn setup request and/or response, whether a CN-split handover procedure should be requested.

Operation 805: The UE establishes a Radio Resource Control (RRC) connection with the source base station.

Operation 806: The SMF transmits a PDU Session Resource Setup Request to the source base station. The request includes information of one or more tunnels to be established between the SMF and the source base station. In particular, the information can indicate that a General Packet Radio Service Tunneling Protocol User data (GTP-U) tunnel has a one-to-one correspondence with the QoS flow of the PDU session. Note that, here, the QoS flow may not have a one-to-one correspondence with a DRB.

Operation 807: The source base station transmits a PDU Session Resource Setup Response to the SMF. If resource setup has failed, the response does not include relevant information. If the resource setup was successful, the response can also include information of the one or more tunnels. For example, the response can include information indicating that that a General Packet Radio Service Tunneling Protocol User data (GTP-U) tunnel has a one-to-one correspondence with the QoS flow. Note that the QoS flow may not have a one-to-one correspondence with a DRB. If the resource setup was successful, the UE and the SMF/UPF can transmit and receive data normally.

Operation 808: The source base station receives measurement reports from the UE that can trigger conditional handover (CHO).

Operation 809: The source base station determines to trigger a handover procedure including a CN-split tunnel switching operation.

Operation 810: The source base station transmits a Handover Required message that includes at least one of: PDU session identifier (ID), target base station ID, Packet Data Convergence Protocol (PDCP) SNdl-2 (which indicates the downlink PDCP sequence number), and/or the mapping between PDCP and GTP-U tunnel (which indicates the correspondence between the PDCP sequence number and the GTP-U sequence number for the handover).

Operation 811: The source base station receives downlink data and transmit it to the UE using PDCP SNdl-1.

Operation 812: The SMF determines to perform the handover procedure including a CN-split tunnel switching operation. Because in the current PDU session, the GTP-U tunnel and the QoS flow have a one-to-one correspondence, the PDU session does not require any re-establishment or modification.

Operation 813: The SMF establishes a new tunnel to the target base station in the same PDU session. The new tunnel shares the same Internet Protocol (IP) address with the existing tunnel. The SMF also transmits the information indicating the mapping between PDCP and GTP-U tunnel to the target base station.

Operation 814: The SMF transmits Handover (HO) command to the source base station. The command can indicate whether data forwarding is needed. Here, there is no need to perform data forwarding as the SMF can transmit downlink data to the target base station by itself.

Operation 815: The source base station receives uplink data from the UE with PDCP SNul (which indicates the uplink PDCP sequence number). The source base station forwards the uplink data to UPF.

Operation 816: The source base station receives downlink data from UPF with sequence number SNdl. The source base station also receives an indication of start of redundant transmission, indicating that UPF transmits downlink data to both the source and target base stations at the same time. The target base station receives downlink data from the UPF. The target base station can determine PDCP SNdl based on the mapping of PDCP and GTP-U and start to buffer data.

Operation 817: The source base station receives in the indication of start of redundant transmission to know that UPF has begun dual-path transmission. The source base station receives PDCP SNdl as well.

Operation 818: The source base can transmit an RRC reconfiguration message to the UE. The RRC reconfiguration message can include configuration information for CHO execution. Because the DRB may not have a one-to-one correspondence with the QoS flow, the DRB should be re-established to satisfy a one-to-one correspondence between the DRB and the QoS flow, indicating that the QoS flow is used for CN-split tunnel switching. The source base station can subsequently receive DL data from the UPF. The source base station can determine the PDCP serial number based on the correspondence between PDCP and GTP-U (e.g., SNdl) and start to buffer.

Operation 819: In some embodiments, the source base station transmits SN status to the target base station indicating SNdl and SNul. SNdl indicates the latest PDCP serial number of the received DL data from UPF. SNul indicates the PDCN serial number of the uplink data to UPF.

Operation 820: The UE can determine that the condition to trigger CHO execution has been satisfied and trigger the handover process. The UE terminates its connection with the source base station and establishes a connection with the target base station. The source and target base stations can receive DL data from the UPF, determine PDCP serial number (e.g., SNdl+1), and begin to buffer data.

Operation 821: The UE has failed to receive acknowledgements for a portion of the data due to the handover. The UE now retransmits that portion to the target base station.

Operation 822: The UE transmits HO complete to the target base station.

Operation 823: The target base station notifies the SMF that handover has been completed.

Operation 824: The SMF transmits a path release request to release any tunnels or paths with the source base station.

Operation 825: The source base station transmits an acknowledgement of the path release.

Figure 9:
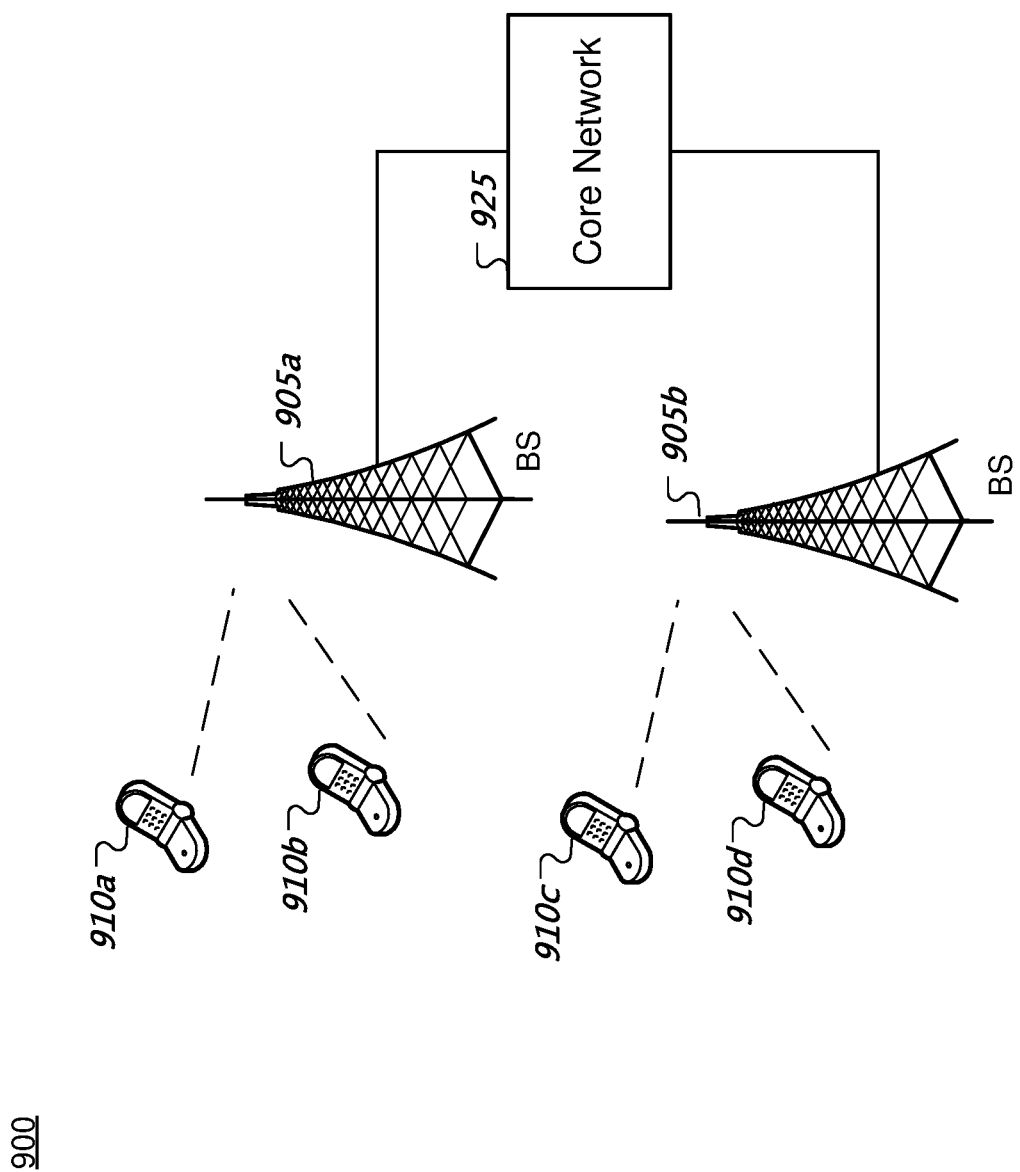
FIG. 9 shows an example of a wireless communication system where techniques in accordance with one or more embodiments of the present technology can be applied.

FIG. 9 shows an example of a wireless communication system 900 where techniques in accordance with one or more embodiments of the present technology can be applied. A wireless communication system 900 can include one or more base stations (BSs) 905a, 905b, one or more wireless devices 910a, 910b, 910c, 910d, and a core network 925. A base station 905a, 905b can provide wireless service to wireless devices 910a, 910b, 910c and 910d in one or more wireless sectors. In some implementations, a base station 905a, 905b includes directional antennas to produce two or more directional beams to provide wireless coverage in different sectors.

The core network 925 can communicate with one or more base stations 905a, 905b. The core network 925 provides connectivity with other wireless communication systems and wired communication systems. The core network may include one or more service subscription databases to store information related to the subscribed wireless devices 910a, 910b, 910c, and 910d. A first base station 905a can provide wireless service based on a first radio access technology, whereas a second base station 905b can provide wireless service based on a second radio access technology. The base stations 905a and 905b may be co-located or may be separately installed in the field according to the deployment scenario. The wireless devices 910a, 910b, 910c, and 910d can support multiple different radio access technologies.

Figure 10:
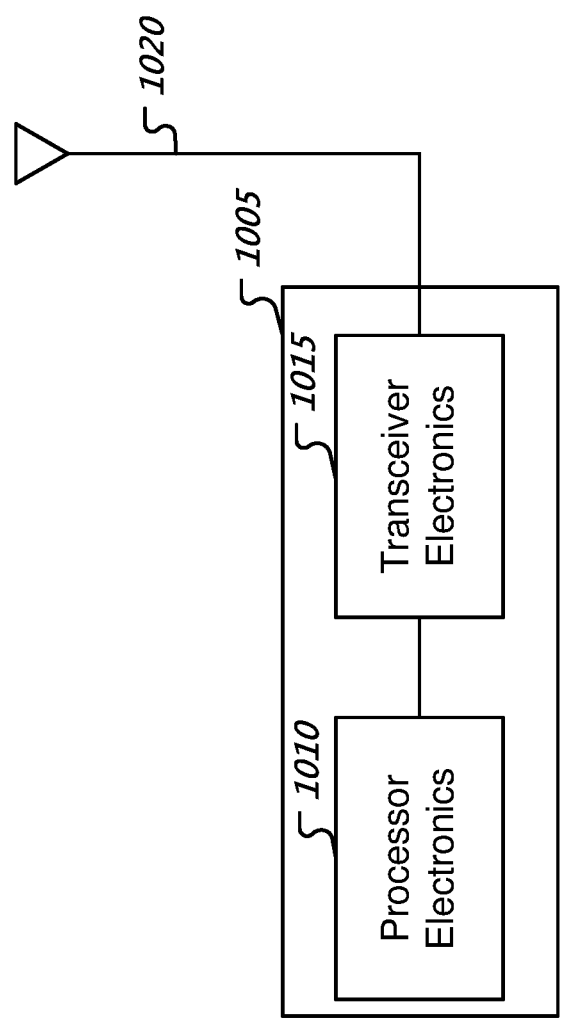
FIG. 10 is a block diagram representation of a portion of a radio station in accordance with one or more embodiments of the present technology can be applied.

FIG. 10 is a block diagram representation of a portion of a radio station in accordance with one or more embodiments of the present technology can be applied. A radio station 1005 such as a base station or a wireless device (or UE) can include processor electronics 1010 such as a microprocessor that implements one or more of the wireless techniques presented in this document. The radio station 1005 can include transceiver electronics 1015 to send and/or receive wireless signals over one or more communication interfaces such as antenna 1020. The radio station 1005 can include other communication interfaces for transmitting and receiving data. Radio station 1005 can include one or more memories (not explicitly shown) configured to store information such as data and/or instructions. In some implementations, the processor electronics 1010 can include at least a portion of the transceiver electronics 1015. In some embodiments, at least some of the disclosed techniques, modules or functions are implemented using the radio station 1005.

Enforcing the mapping rules with respect to the PDU session, the QoS flow, and the DRB allows the UPF/SMF to transmit downlink data to both the source base station and the target base station more efficiently, thereby reducing delays and/or service disruptions for the UEs during handover procedures. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   transmitting, from a communication node to a source base station, a first message that comprises an information associated with a Protocol Data Unit (PDU) session, the first message further indicating a resource assignment for the PDU session;
   performing, by the communication node, a handover procedure from a source base station to a target base station based on the information associated with the PDU session, wherein the information includes a mapping rule that indicates that at least one tunnel in a list of tunnels that carry user data has a one-to-one correspondence with a Quality of Service (QOS) flow, that the PDU session has a one-to-one correspondence with the QoS flow, and that the QoS flow has a one-to-one correspondence with a Data Radio Bearer (DRB); and transmitting, by the communication node for the handover procedure, downlink data to both the source base station and the target base station, the method further comprising:

receiving, by the communication node, a request from the source base station, the request comprising an indicator indicating a support for a core-network (CN) split function that allows interworking between multiple radio access technologies at a core network level.

2. The method of claim 1, wherein performing the handover procedure comprises:

transmitting, from the communication node to the source base station, a second message that includes the information associated with the PDU session, wherein the PDU session is different from an existing PDU session; and switching the existing PDU session to the PDU session.

3. A method for wireless communication, comprising:

receiving, by a base station, a first message from a communication node, the first message comprising information associated with a Protocol Data Unit (PDU) session and a resource assignment for the PDU session, wherein the information includes a mapping rule that indicates that at least one tunnel in a list of tunnels that carry user data has a one-to-one correspondence with a Quality of Service (QOS) flow, that the PDU session has a one-to-one correspondence with the QoS flow, and that the QoS flow has a one-to-one correspondence with a Data Radio Bearer (DRB); and transmitting, from the base station, a second message to the communication node in response to the first message indicating resources that have been set up or resources that failed to be set up for the PDU session, wherein the method further comprises transmitting by the base station to the communication node a first request for initiating a hand-over procedure from the base station to a target base station, and for the first request for the hand-over procedure, receiving, by the base station and the target base station, downlink data from the communication node, the method further comprising:

transmitting, from the base station, a second request to the communication node, the second request comprising an indicator indicating a support for a core-network (CN) split function that allows interworking between multiple radio access technologies at a core network level.

4. The method of claim 3, wherein the first request is transmitted prior to receiving the first message or after transmitting the second message.

5. The method of claim 4, wherein the PDU session is different than an existing PDU session, and wherein the first request is transmitted prior to receiving the first message, the method further comprising:

switching to the PDU session from the existing PDU session.

6. The method of claim 3, further comprising:

receiving, by the base station, an indication for transmitting data to a mobile device based on a QoS flow corresponding to a tunnel associated with the PDU session; and establishing, by the base station, a new Data Radio Bearer (DRB) that has a one-to-one correspondence with the QoS flow.

7. A wireless communication apparatus comprising a processor and a memory storing instructions, execution of which by the processor causes the apparatus to perform operations comprising:

transmitting a first message to a source base station that comprises an information associated with a Protocol Data Unit (PDU) session, the first message further indicating a resource assignment for the PDU session;

performing a handover procedure from the source base station to a target base station based on information associated with the PDU session, wherein the information includes a mapping rule that indicates that at least one tunnel in a list of tunnels that carry user data has a one-to-one correspondence with a Quality of Service (QOS) flow, that the PDU session has a one-to-one correspondence with the QoS flow, and that the QoS flow has a one-to-one correspondence with a Data Radio Bearer (DRB); and transmitting, for the handover procedure, downlink data to both the source base station and the target base station, the operations further comprising:

receiving a request from the source base station, the request comprising an indicator indicating a support for a core-network (CN) split function that allows interworking between multiple radio access technologies at a core network level.

8. The apparatus of claim 7, wherein performing the handover procedure comprises:

transmitting, to the source base station, a second message that includes the information associated with the PDU session, wherein the PDU session is different from an existing PDU session; and switching the existing PDU session to the PDU session.

9. A wireless communication apparatus comprising a processor and a memory storing instructions, execution of which by the processor causes the apparatus to perform operations comprising:

receiving, a first message from a communication node, the first message comprising information associated with a Protocol Data Unit (PDU) session and a resource assignment for the PDU session, wherein the information includes a mapping rule that indicates that at least one tunnel in a list of tunnels that carry user data has a one-to-one correspondence with a Quality of Service (QOS) flow, that the PDU session has a one-to-one correspondence with the QoS flow, and that the QoS flow has a one-to-one correspondence with a Data Radio Bearer (DRB); and transmitting a second message to the communication node in response to the first message indicating resources that have been set up or resources that failed to be set up for the PDU session, wherein the operations further comprise transmitting to the communication node a first request for initiating a hand-over procedure from the apparatus to a target base station, and for the first request for the hand-over procedure, receiving, by the apparatus and the target base station, downlink data from the communication node, the operations further comprising:

transmitting a second request to the communication node, the second request comprising an indicator indicating a support for a core-network (CN) split function that allows interworking between multiple radio access technologies at a core network level.

10. The apparatus of claim 9, wherein the operations further comprise:
- receiving an indication for transmitting data to a mobile device based on a QoS flow corresponding to a tunnel associated with the PDU session; and
- establishing a new Data Radio Bearer (DRB) that has a one-to-one correspondence with the QoS flow.

11. The apparatus of claim 9, wherein the first request is transmitted prior to receiving the first message or after transmitting the second message.

12. The apparatus of claim 9, wherein the PDU session is different than an existing PDU session, and wherein the first request is transmitted prior to receiving the first message, and wherein the operations further comprise:
- switching to the PDU session from the existing PDU session.

* * * * *